(12) United States Patent
Piazza et al.

(10) Patent No.: US 8,171,225 B2
(45) Date of Patent: May 1, 2012

(54) CACHE FOR A MULTI THREAD AND MULTI CORE SYSTEM AND METHODS THEREOF

(75) Inventors: Thomas A Piazza, Granite Bay, CA (US); Michael K Dwyer, El Dorado Hills, CA (US); Scott Cheng, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 452 days.

(21) Appl. No.: 11/770,120

(22) Filed: Jun. 28, 2007

(65) Prior Publication Data

US 2009/0006729 A1   Jan. 1, 2009

(51) Int. Cl.
*G06F 12/00* (2006.01)
(52) U.S. Cl. ............... 711/123; 711/122; 711/E12.052
(58) Field of Classification Search ............ 711/122
See application file for complete search history.

(56) References Cited

U.S. PATENT DOCUMENTS

| 6,141,732 | A  | * | 10/2000 | Adams ........................ 711/137 |
| 6,195,748 | B1 | * | 2/2001 | Chrysos et al. ............... 712/227 |
| 6,473,832 | B1 |   | 10/2002 | Ramagopal et al. |
| 6,549,930 | B1 |   | 4/2003 | Chrysos et al. |
| 7,228,520 | B1 |   | 6/2007 | Keller et al. |
| 2005/0289142 | A1 | * | 12/2005 | Adams ........................... 707/6 |

FOREIGN PATENT DOCUMENTS

WO   2009/006018 A2   1/2009
WO   2009/006018 A3   3/2009

OTHER PUBLICATIONS

International Preliminary Report on Patentability received for PCT/US2008/067279, mailed on Jan. 14, 2010, 6 pages.
International Search Report and Written Opinion for PCT/US2008/067279, mailed on Jan. 16 2009. 11 pages.
European Office Action dated Jun. 3, 2011 issued in related European Patent Application No. 08771309.5-1229.
Chinese Office Action dated Sep. 14, 2011 issued in related Chinese Patent Application No. 200880022206.7 (19 pgs.).

* cited by examiner

*Primary Examiner* — Reginald Bragdon
*Assistant Examiner* — Hamdy Ahmed
(74) *Attorney, Agent, or Firm* — Grossman, Tucker, Perreault & Pfleger, PLLC

(57) ABSTRACT

A method includes storing a plurality of data RAM, holding information for all outstanding requests forwarded to a next-level memory subsystem, clearing information associated with a serviced request after the request has been fulfilled, determining if a subsequent request matches an address supplied to one or more requests already in-flight to the next-level memory subsystem, matching fulfilled requests serviced by the next-level memory subsystem to at least one requester who issued requests while an original request was in-flight to the next level memory subsystem, storing information specific to each request comprising a set attribute and a way attribute configured to identify where the returned data should be held in the data RAM once the data is returned, the information specific to each request further including at least one of thread ID, instruction queue position and color, and scheduling hit and miss data returns.

20 Claims, 4 Drawing Sheets

# CACHE FOR A MULTI THREAD AND MULTI CORE SYSTEM AND METHODS THEREOF

FIELD

The present disclosure relates to a cache for improving performance of a processor, and, more particularly, to a cache for a multi-threaded and/or multi-core system for improving the performance of the cache of the processor.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

DETAILED DESCRIPTION OF THE DISCLOSURE

For a thorough understanding of the present disclosure, refer to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein is for the purpose of description and should not be regarded as limiting.

The terms "first," "second," and the like, herein do not denote any order, quantity, or importance, but rather are used to distinguish one element from another. The terms "a" and "an" herein do not denote a limitation of quantity, but rather denote the presence of at least one of the referenced item.

Figure 1:
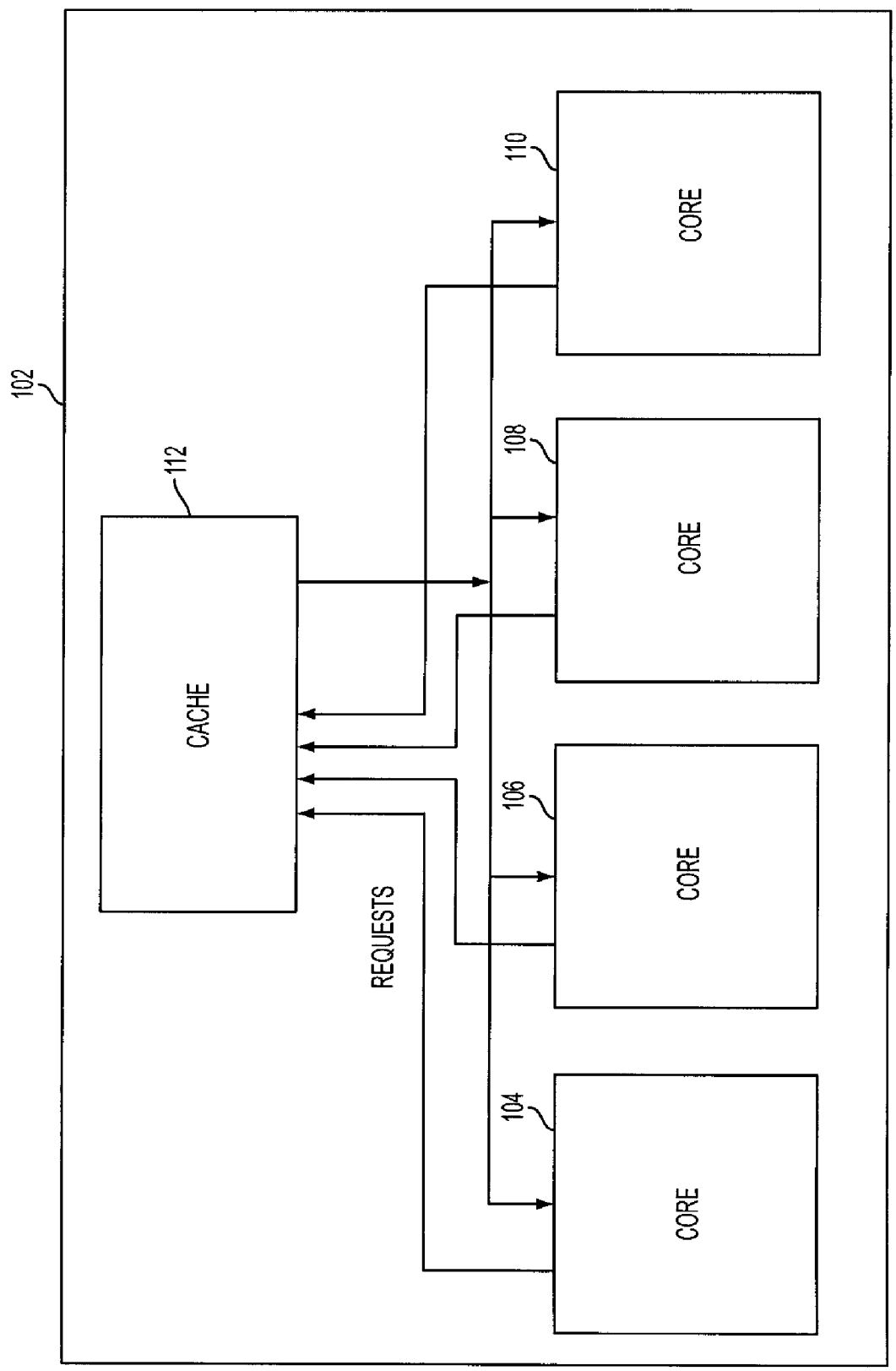
FIG. 1 is a block diagram illustrating a multi thread and multi core system for improving the performance of a processor, according to an exemplary embodiment of the present disclosure.

FIG. 1 is a block diagram illustrating a multi-thread and multi core system 102 for improving the performance of a processor. The system may include a plurality of cores 104, 106, 108 and 110 and a cache 112 connected to the plurality of cores 104, 106, 108 and 110. The cache 112 may support the plurality of cores 104, 106, 108 and 110 with minimum effect on the performance of the cache 112. The plurality of cores 104, 106, 108 and 110 may simultaneously process the multi threads, thereby enhancing the performance of the processor. One exemplary architecture of the cache 112 is described below in detail in conjunction with FIG. 2.

Figure 2A:
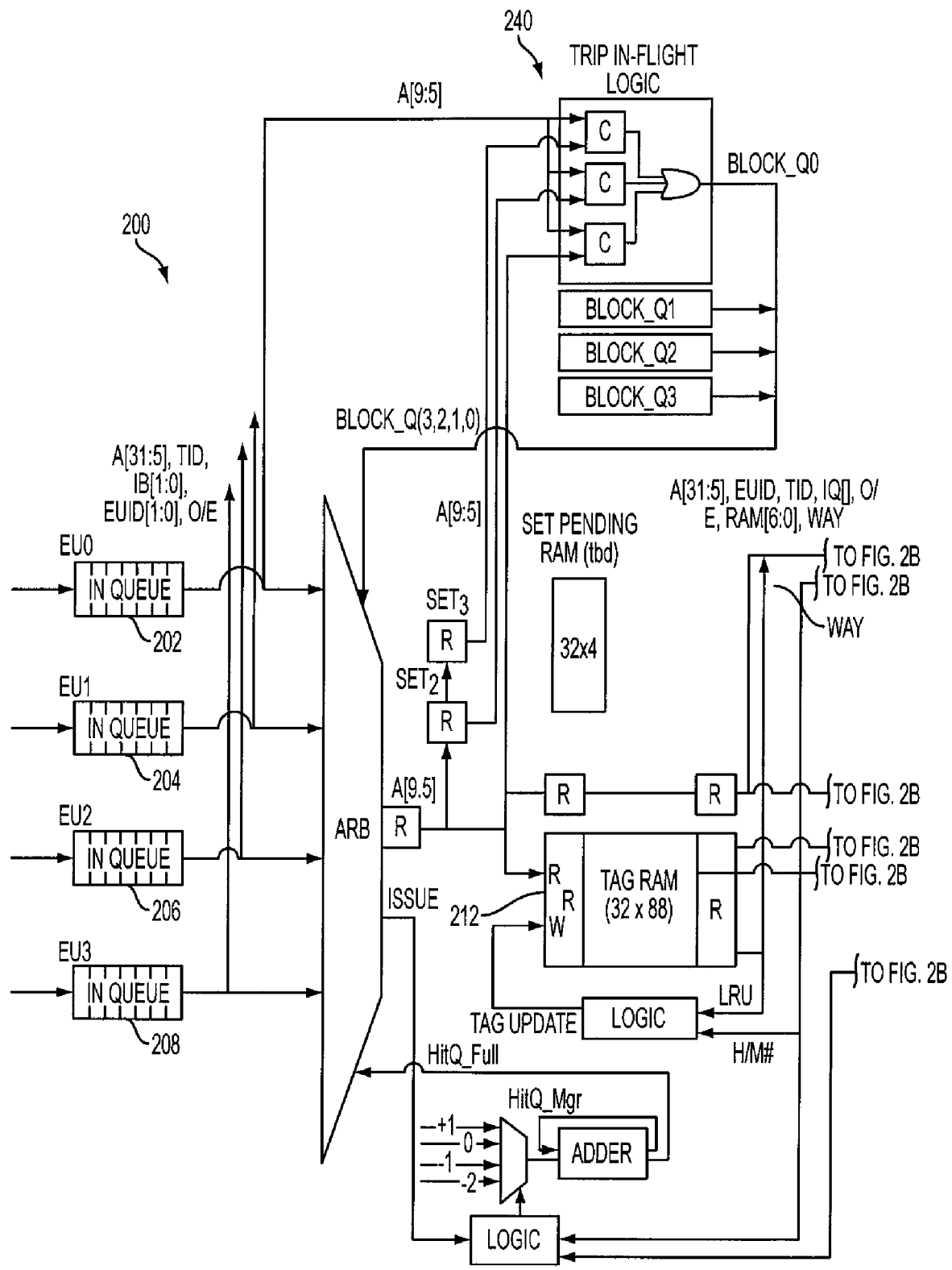
FIG. 2 is a block diagram illustrating an architecture of a cache, according to an exemplary embodiment of the present disclosure.
Figure 2B:
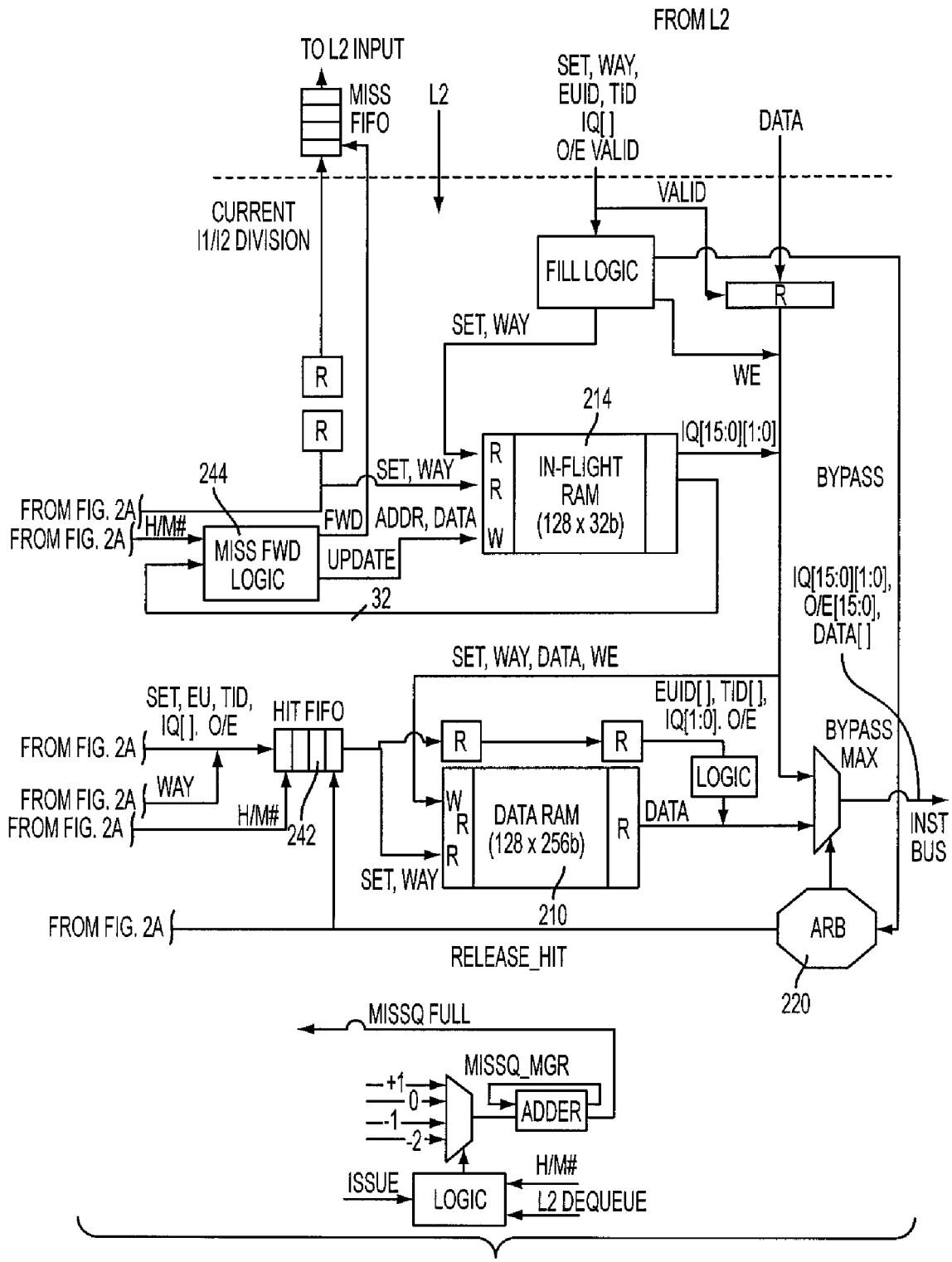

FIG. 2 is a block diagram 200 illustrating architecture of the cache 112. The cache 112 may include a plurality of instruction queues 202, 204, 206 and 208; a data Random Access Memory (RAM) 210; a tag RAM 212; an in-flight RAM 214; and an arbiter 220. The plurality of instruction queues 202, 204, 206 and 208 may be used for capturing requests made to the cache by the cores. The data RAM 210 may be capable of storing a plurality of data of various forms. Arbiter 220 may indicate the point at which hit and miss data returning to each execution unit may collide and need arbitration so as to honor any limitations of the receiving units, such as sending only one response back per clock cycle.

In some embodiments, each execution unit (EU) may be configured to handle out-of-order returns. The EU's may provide, with each instruction fetch request, the instruction queue location to place the cache line once it returns. Since each thread may have, for example, 3 cachelines of buffering, a 2b code may be sufficient. This is indicated in FIG. 2 as IQ[1:0] for instruction queue address[1:0]. Further, the request may be for the odd instruction in a cacheline such as the case of an unaligned jump address. This signal is indicated in FIG. 2 as "O/E" signaling 'odd' or 'even'.

In some embodiments, there may be 1 instruction queue per execution unit. The cache architecture described herein may discard head-of-queue at issue time since each issue is guaranteed to complete (i.e., it may not need to re-issue) and any routing or meta data may be carried with the request, there may not be a block on the head of a queue, thus no need to flatten the queues to expose all entries. The maximum depth of an instruction buffer may be a performance decision, limited only by the total number of destinations in an execution unit's instruction FIFO. For example, this may be limited to 12 (i.e., 4 threads/EU×3 cache lines deep/inst-buffer).

The tag RAM 212 may be configured for storing the memory addresses of the plurality of data stored in the data RAM 210. The tag RAM 212 may identify data from a memory, which is currently stored in the data RAM 210. The memory addresses stored in the tag RAM 212 may determine whether a cache lookup results in a hit or a miss. The size of the tag RAM 212 may be proportional to the capacity and organization of the data RAM 112.

In some embodiments, the tag may take more than one clock to compare and update. For example, 3 clocks may be used. Thus, there is the potential for a given issue to hit a tag that may change due to a previous miss, but which has not yet been written to the tag RAM 212. A copy of the set addresses issued during the last 3 clocks may be stored (e.g., in registers located to the right of arbiter in FIG. 2) and compared against each head of queue. This may require a plurality of comparators in parallel, shown in FIG. 2 as tag in-flight logic 240. If there is a match between a queue's head and only one of the sets issued in the last 3 clocks, that queue may be blocked from arbitration.

A cache hit may be forwarded to a hit FIFO 242, the depth of which may be a performance/cost decision. With a finite depth, the FIFO may fill up on occasion. Tracking the current depth of the FIFO 242 is the hit-FIFO tracking circuitry, which may consist of some combinatorial logic as well as an adder or other circuitry. Each time an issue occurs, the hit/miss outcome is unknown, and the adder may take a conservative route and assume a hit. It therefore adds 1 to its current value. If the result is later determined to be a miss, the adder may subtract 1. The adder may also subtract one for each entry removed from the FIFO and forwarded to the cache RAM. Since a forward and mispredicted hit may occur in the same clock, the capability to subtract 2 may be supported. Cachelines returned from the hit path may be for a single thread. A small amount of logic may be present to synthesize the 16 channel IQ O/E signaling, with only the proper thread enabled, to the bypass MUX.

A cache miss may be forwarded to miss-logic 244. This circuitry may maintain for each cache line, the EU instruction queue positions waiting on that linefill. This information may be held in the in-flight RAM 214 (e.g., 128 entries, one per cacheline). The width of the RAM may vary. For each miss, the in-flight RAM 214 may be queried for the set/way. If there are no outstanding requests for that line, then the miss may be forwarded to the miss queue, and the thread's position in the RAM may be updated to show the thread waiting on the linefill. If query indicates one or more may already be in flight then the miss may be squashed and the thread's position updated. Miss data may return via fill logic which may see all cacheline returns from the L2. For each return a look-up may be performed for the associated set in the In-flight RAM 214, indicating all requesting EUs waiting a fill for that cacheline of data. The cacheline data and control indicating all pending fills to EU and instruction queue positions may be sent to the instruction bus. The bypass mux arbiter may join hit and miss fills and drive the instruction bus. It may service miss returns over hit returns. In some embodiments a miss return may cause back pressure on the hit queue.

The in-flight RAM 214 may be configured to maintain identification and accounting information for all outstanding misses at any instant. Identification may consist of determining which thread and execution unit (EU) made the request, the destination location, corresponding to the set and way, to place the eventual returned data in the data RAM, and a color indicator which may identify which sequential stream from the requesting thread/EU the request belongs to. When the caches starts to process a request, the requested address may be checked in the tag RAM 212 and if a match is not found (i.e. results in a miss) the request may be forwarded to the in-flight RAM 214 and its supporting logic. The RAM 214 and logic may compare the address of the new miss request against the subset of addresses (typically mapping to the same cache set) of all outstanding requests which have the potential to match as held in the in-flight RAM 214. If a match exists, a request corresponding to that address has already been forward to the next level memory subsystem by a previous miss (i.e. the request is already in-flight), and the new miss request and its associated identification and accounting information are logged into the in-flight RAM 214, and no request is made of the next level memory subsystem. If a match is not found, indicating that there is not an outstanding request to the next level memory subsystem for this address, the misses identification and accounting information are logged into the in-flight RAM 214 and the request may be forwarded to the next-level memory subsystem. Once the next-level memory subsystem has fulfilled a miss request provided by this cache, it may return the requested data and either the requested address and/or associated accounting information, based on implementation choice. The address/accounting information may be compared to the subset potential matches (typically mapping to the same set) held in the in-flight RAM 214 contents in an effort to find one or more matches. The set of matches found may indicate the list of EU/thread combinations that had requested this same data. The in-flight RAM 214 and its associated logic may broadcast instruction data to a plurality of threads in the plurality of cores 104, 106, 108 and 110 of the processor, thereby improving the performance of the processor. Further, for the miss request return from another cache, a lookup may be performed in the in-flight RAM 214 and all pending threads waiting for the instruction data may be acknowledged in a single clock. Thus, the architecture of the cache 112 provides access of the instruction data to the plurality of threads.

The output interface of the cache 112 to each Execution Unit (EU) may be provided with separate data valid bit returned to each EU for each EU/thread/instruction-queue-entry/color permutation to allow the returned data to be indicated as valid simultaneously to all possible destination locations provided in the EU implementation. Further, the in-flight RAM 214 storage is changed to store the set attribute and the way attribute. Accordingly, the architecture of the cache 112 may provide the access of the plurality of data to a plurality of requests in a single clock. Further, the overall performance of the cache 112 is improved compared to the typical cache implementation.

The interface of the cache 112 with EU comprises a color bit to allow the EU to prefetch an instruction ahead of the point of its execution in a speculative manner, and later when data is returned, identify if the returned data is valid or stale. To accomplish this, a "color bit", i.e. a multi-state variable, may be used identify the current and arbitrary "color" associated with the current sequential instruction stream being executed by a thread. In some embodiments, color may be maintained per thread per EU. The value of the color bit may be changed whenever a discontinuity in the instruction request stream is encountered as the EU executes instructions, for example in the case of a 'jump' instruction. The color information may be sent to the cache as part of any cache request. The cache 112 described herein may support handling two colors per thread, although this may be easily extended to handle 'n' colors. The EU provides a color bit with each request made of the cache, and the cache maintains the color bit with all accounting information held while the request is being serviced. Upon return of the data by the cache to the EU, the cache may return the value of the color bit which was sent as part of the original request. This allows the EU/thread to compare the returned color with the execution unit's (EU) current color maintained locally. A color-match indicates that the EU is still operating on the sequential instruction stream in effect when the request was made to the cache, and thus the returned data may be relevant to the instruction stream being executed; a mis-match may indicate that the EU/thread has encountered an instruction stream discontinuity during the time the request was outstanding, and thus the returned data may not be relevant to the current stream of execution and may be discarded. This mechanism allows EU/thread to make speculative instruction requests with a new color at every instruction stream discontinuity, even though there may be outstanding and potentially stale requests pending for a same thread in the cache 112. This may improve the overall performance of the cache 112 having large kernels causing low hit ratio by determining at data-return time the validity of the returned data.

The arbiter 220 may be used for scheduling data return to the EUs. On any given clock, data from either a hit or a miss or both may be ready for return. In some embodiments, an arbitration algorithm may be used to determine the rules as to which data-return to service.

Figure 3:
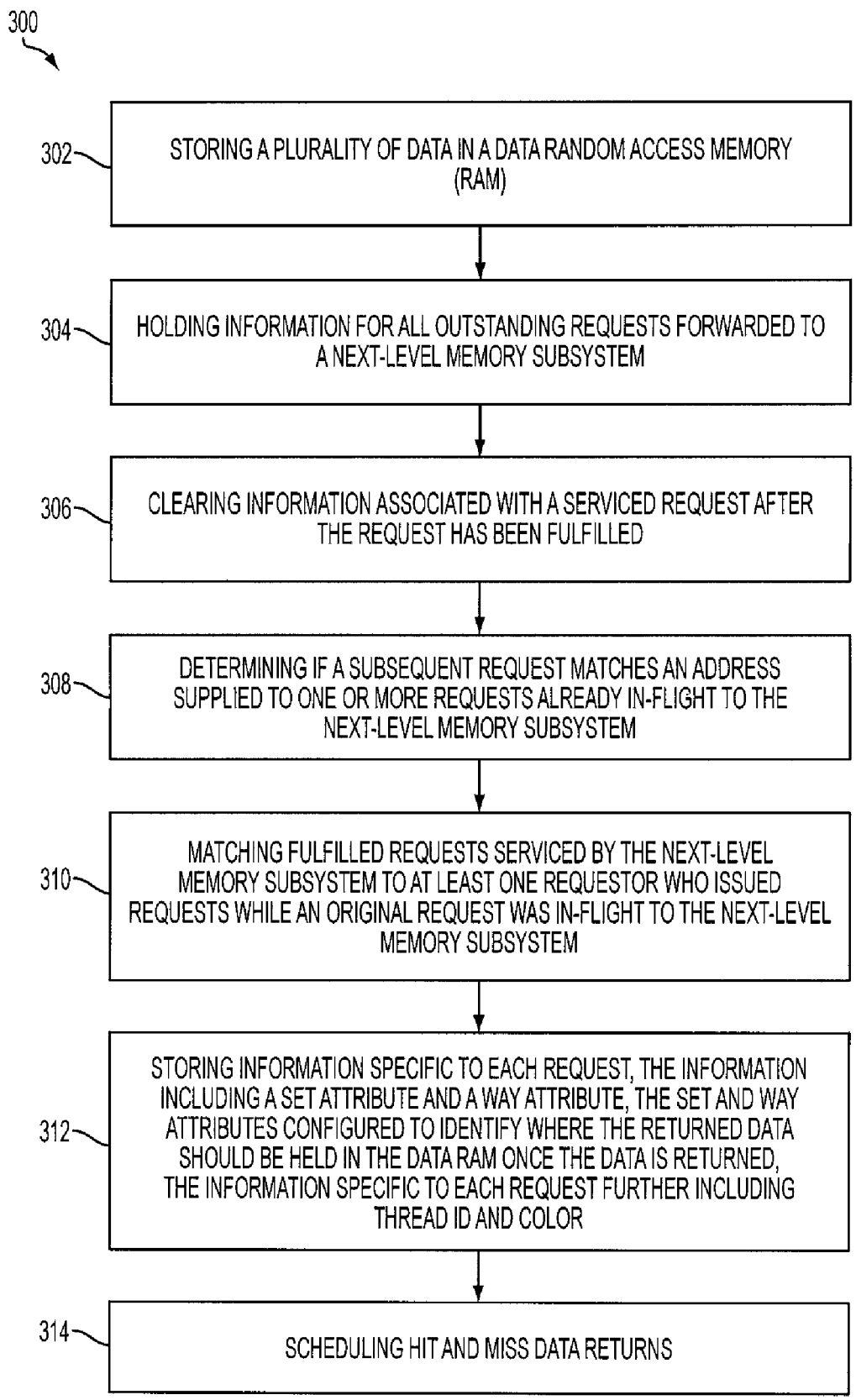
FIG. 3 is a flow diagram illustrating a method for improving the performance of a cache of a processor, according to an exemplary embodiment of the present disclosure.

FIG. 3 is a flow diagram illustrating a method for improving the performance of the processor. The method may include storing a plurality of data in a data Random Access Memory (RAM) (302). The method may further include holding information for all outstanding requests forwarded to a next-level memory subsystem (304). The method may also include clearing information associated with a serviced request after the request has been fulfilled (306). The method may additionally include determining if a subsequent request matches an address supplied to one or more requests already in-flight to the next-level memory subsystem (308). The method may further include matching fulfilled requests serviced by the next-level memory subsystem to at least one requestor who issued requests while an original request was in-flight to the next level memory subsystem (310). The method may also include storing information specific to each request, the information including a set attribute and a way attribute, the set and way attributes configured to identify where the returned data should be held in the data RAM once the data is returned, the information specific to each request further including thread ID and color (312). The method may additionally include scheduling hit and miss data returns (314).

The foregoing descriptions of specific embodiments of the present disclosure have been presented for purposes of illustration and description. They are not intended to be exhaustive or to limit the disclosure to the precise forms disclosed, many modifications and variations are possible in light of the above teaching. The embodiments were chosen and described in order to best explain the principles of the disclosure and its practical application, to thereby enable others skilled in the art to best utilize the disclosure and various embodiments with various modifications as are suited to the particular use contemplated. It is understood that various omission and substitutions of equivalents are contemplated as circumstances may suggest or render expedient, but such are intended to cover the application or implementation without departing from the spirit or scope of the claims of the present disclosure.

What is claimed is:

1. A cache for a processor, the cache comprising:
   a plurality of instruction queues configured to handle at least one out-of-order instruction return, wherein each instruction queue corresponds to an execution unit and the instruction queues are configured to be used for capturing requests made to the cache by a plurality of cores of the processor;
   a data Random Access Memory (RAM) capable of storing a plurality of data;
   a tag RAM capable of storing memory addresses of the plurality of data stored in the data RAM, wherein said memory addresses stored in said tag RAM are utilized to determine whether a cache lookup results in a hit or a miss;
   an in-flight RAM capable of:
      holding outstanding requests forwarded to a next-level memory subsystem;
      clearing a service request after the request has been fulfilled;
      determining if a subsequent request matches an address supplied to one or more requests already in-flight to the next-level memory subsystem;
      matching fulfilled requests serviced by the next-level memory subsystem to at least one requestor who issued requests while an original request was in-flight to the next-level memory subsystem; and
      storing information specific to each request, the information including a set attribute and a way attribute, the set and way attributes configured to identify where the returned data should be held in the data RAM once the data is returned, the information specific to each request further including thread ID, instruction queue position and a color indicator configured to identify a sequential stream in a requesting thread that made the request to the cache, wherein the color indicator is configured to allow the requesting thread to determine whether the returned data is valid or stale; and
   an arbiter for scheduling hit and miss data returns to each execution unit.

2. The cache of claim 1, wherein the cache is capable of providing access to the plurality of data stored in the data RAM to the plurality of cores.

3. The cache of claim 1, wherein the data RAM reduces a latency of the plurality of data stored in the data RAM.

4. The cache of claim 1, wherein the at least one of thread ID, instruction queue position and color may be supplied back to the requestor once the request is fulfilled.

5. The cache of claim 4, wherein the cache returns data to the plurality of threads in a single clock time.

6. The cache of claim 1, further comprising an execution unit (EU) interface comprising a color bit for determining the relevance of returned data at the time the data is returned.

7. The cache of claim 6, wherein the EU interface improves a performance of the cache of the processor having a low hit ratio.

8. A multi core and a multi thread system, the system comprising:
   a plurality of cores; and
   a cache connected to the plurality of cores, the cache comprising
      a plurality of instruction queues configured to handle at least one out-of-order instruction return, wherein each instruction queue corresponds to an execution unit and the instruction queues are configured to be used for capturing requests made to the cache by the plurality of cores;
   a data Random Access Memory (RAM) capable of storing a plurality of data;
   a tag RAM capable of storing memory addresses of the plurality of data stored in the data RAM, wherein said memory addresses stored in said tag RAM are utilized to determine whether a cache lookup results in a hit or a miss;
   an in-flight RAM capable of:
      holding outstanding requests forwarded to a next-level memory subsystem;
      clearing a service request after the request has been fulfilled;
      determining if a subsequent request matches an address supplied to one or more requests already in-flight to the next-level memory subsystem;
      matching fulfilled requests serviced by the next-level memory subsystem to at least one requestor who issued requests while an original request was in-flight to the next-level memory subsystem; and
      storing information specific to each request, the information including a set attribute and a way attribute, the set and way attributes configured to identify where the returned data should be held in the data RAM once the data is returned, the information specific to each request further including thread ID, instruction queue position and a color indicator configured to identify a sequential stream in a requesting thread that made the request to the cache, wherein the color indicator is configured to allow the requesting thread to determine whether the returned data is valid or stale; and
   an arbiter for scheduling hit and miss data returns to each execution unit.

9. The system of claim 8, wherein the cache is capable of providing access to the plurality of data stored in the data RAM to the plurality of cores.

10. The system of claim 8, wherein the data RAM reduces a latency of the plurality of data stored in the data RAM.

11. The system of claim 8, wherein at least one of the thread ID, instruction queue position, and color may be supplied back to the requestor once the request is fulfilled.

12. The system of claim 11, wherein the cache provides access of the instruction data to the plurality of threads in a single clock time.

13. The system of claim 8, further comprising an execution unit (EU) interface comprising a color bit for determining the relevance of returned data at the time the data is returned and allowing speculative requests by the EUs.

14. The system of claim 13, wherein the EU interface improves a performance of the cache of the processor having a low hit ratio.

15. A method for improving performance of a cache of a processor, the method comprising:
  capturing, by a plurality of instruction queues, requests made to the cache by one or more core(s) of the processor, wherein each instruction queue corresponds to an execution unit;
  storing a plurality of data in a data Random Access Memory (RAM);
  storing memory addresses of the plurality of data stored in the data RAM in a tag RAM, wherein said memory addresses stored in said tag RAM are utilized to determine whether a cache lookup results in a hit or a miss;
  holding all outstanding requests forwarded to a next-level memory subsystem;
  clearing a service request after the request has been fulfilled;
  determining if a subsequent request matches an address supplied to one or more requests already in-flight to the next-level memory subsystem;
  matching fulfilled requests serviced by the next-level memory subsystem to at least one requestor who issued requests while an original request was in-flight to the next-level memory subsystem;
  storing information specific to each request, the information including a set attribute and a way attribute, the set and way attributes configured to identify where the returned data should be held in the data RAM once the data is returned, the information specific to each request further including thread ID, instruction queue position and a color indicator configured to identify a sequential stream in a requesting thread that made the request to the cache, wherein the color indicator is configured to allow the requesting thread to determine whether the returned data is valid or stale; and
  scheduling hit and miss data returns for each execution unit.

16. The method of claim 15, wherein the cache is capable of providing access of the plurality of data stored in the data RAM to the plurality of cores.

17. The method of claim 15, wherein the data RAM reduces a latency of the plurality of data stored in the data RAM.

18. The method of claim 15, wherein the thread ID and color may be supplied back to the requestor once the request is fulfilled.

19. The method of claim 18, wherein the cache provides access of the instruction data to the plurality of threads in a single clock time.

20. The method of claim 15, further comprising an EU interface comprising a color bit for reducing a latency in case of the jump instruction.

* * * * *